United States Patent
Fernald

(10) Patent No.: US 9,570,908 B2
(45) Date of Patent: Feb. 14, 2017

(54) POWER MANAGEMENT SYSTEM

(75) Inventor: Kenneth W. Fernald, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 1217 days.

(21) Appl. No.: 13/369,705

(22) Filed: Feb. 9, 2012

(65) Prior Publication Data

US 2013/0207467 A1  Aug. 15, 2013

(51) Int. Cl.
*H02J 1/00* (2006.01)
*H02J 1/14* (2006.01)

(52) U.S. Cl.
CPC .............. *H02J 1/14* (2013.01); *Y10T 307/406* (2015.04)

(58) Field of Classification Search
None
See application file for complete search history.

(56) References Cited

U.S. PATENT DOCUMENTS

| | | | |
|---|---|---|---|
| 8,026,636 B2 * | 9/2011 | Oh | G05F 1/46 307/31 |
| 2007/0024360 A1 * | 2/2007 | Markowski | 330/123 |
| 2008/0012645 A1 * | 1/2008 | Ichitsubo et al. | 330/307 |
| 2008/0272651 A1 * | 11/2008 | Fong | 307/31 |
| 2011/0080102 A1 * | 4/2011 | Ge et al. | 315/200 R |
| 2011/0182094 A1 * | 7/2011 | Lumsden et al. | 363/126 |
| 2013/0131771 A1 * | 5/2013 | Lehmann et al. | 607/137 |

* cited by examiner

*Primary Examiner* — Jared Fureman
*Assistant Examiner* — Aqeel Bukhari
(74) *Attorney, Agent, or Firm* — Trop Pruner & Hu, P.C.

(57) ABSTRACT

An apparatus is disclosed, which includes a system that includes loads, linear regulators, switches and a controller. The linear regulators supply power to the loads, and the controller is adapted to use the switches to selectively couple power sources to the linear regulators to regulate a collective power dissipation of linear regulators.

18 Claims, 5 Drawing Sheets

POWER MANAGEMENT SYSTEM

BACKGROUND

Electronic systems typically employ voltage regulators for purposes of generating supply voltages for the various components of the system. One type of voltage regulator is a DC-to-DC switching converter, which typically regulates its output voltage by selectively activating and deactivating switches to energize and de-energize one or more energy storage components of the switching regulator. Another type of voltage regulator is a linear regulator, which typically regulates its output voltage by controlling a difference between the output voltage and the regulator's input voltage. More specifically, a typical linear regulator includes a differential amplifier that controls a voltage drop across a pass transistor of the regulator for purposes of regulating the output voltage.

SUMMARY

In an exemplary embodiment, an apparatus includes a system, which includes loads, linear regulators, switches and a controller. The linear regulators supply power to the loads, and the controller is adapted to use the switches to selectively couple power sources to the linear regulators to regulate a collective power dissipation of the linear regulators.

In another exemplary embodiment, a technique includes using linear regulators to supply power to loads. The technique includes regulating a collective power dissipation of the linear regulators, which includes selectively coupling power sources to the linear regulators.

In yet another exemplary embodiment, an apparatus includes an integrated circuit, which includes a plurality of loads, linear regulators, switches and a controller. The linear regulators supply power to the plurality of loads. The controller is adapted to operate the switches to select a switch coupling configuration from a plurality of switch coupling configurations to couple power sources to the linear regulators based at least in part on power dissipations associated with the switch coupling configurations.

Advantages and other desired features will become apparent from the following drawing, description and claims.

DETAILED DESCRIPTION

Figure 1:
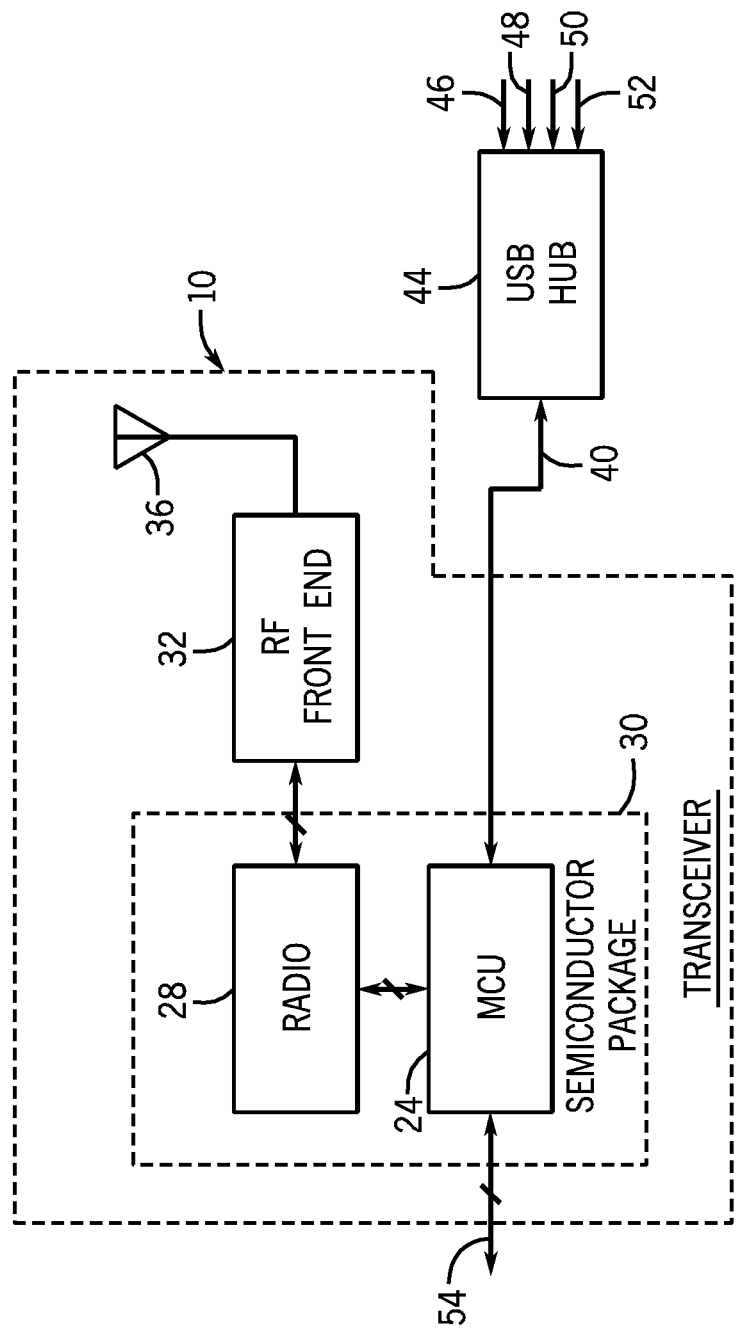
FIG. 1 is a schematic diagram of a transceiver system according to an exemplary embodiment.

Referring to FIG. 1, in accordance with embodiments disclosed herein, an embedded microcontroller unit (MCU) 24 may be used in a variety of applications, such as applications in which the MCU 24 controls various aspects of a transceiver 10 (as a non-limiting example). In this regard, the MCU 24, for this particular example, may be part of an integrated circuit (IC), or semiconductor package 30, which also includes a radio 28. As a non-limiting example, the MCU 24 and the radio 28 may collectively form a packet radio, which processes incoming and outgoing streams of packet data. To this end, the transceiver 10 may further include a radio frequency (RF) front end 32 and an antenna 36, which receives and transmits RF signals (frequency modulated (FM) signals, for example) that are modulated with the packet data.

As non-limiting examples, the transceiver 10 may be used in a variety of applications that involve communicating packet stream data over relatively low power RF links and as such, may be used in wireless point of sale devices, imaging devices, computer peripherals, cellular telephone devices, etc. As a specific non-limiting example, the transceiver 10 may be employed in a smart power meter which, through a low power RF link, communicates data indicative of power consumed by a particular load (a residential load, for example) to a network that is connected to a utility. In this manner, the transceiver 10 may transmit packet data indicative of power consumed by the load to mobile meter readers as well as to an RF-to-cellular bridge, for example. Besides transmitting data, the transceiver 10 may also receive data from the utility or meter reader for such purposes (as non-limiting examples) as inquiring as to the status of various power consuming devices or equipment; controlling functions of the smart power meter; communicating a message to a person associated with the monitored load, etc.

As depicted in FIG. 1, in addition to communicating with the radio 28, the MCU 24 may further communicate with other devices and in this regard may, as examples, communicate over communication lines 54 with a current monitoring and/or voltage monitoring device of a smart power meter (as a non-limiting example) as well as communicate with devices over a serial bus 40. In this manner, the serial bus 40 may include data lines that communicate clocked data signals, and the data may be communicated over the serial bus 40 data in non-uniform bursts. As a non-limiting example, the serial bus may be a Universal Serial Bus (USB) 40, as depicted in FIG. 1, in accordance with some embodiments. As described herein, in addition to containing lines to communicate data, the serial bus, such as the USB 40, may further include a power line (a 5 volt power line, for example) for purposes of providing power to serial bus devices, such as the MCU 24. Various USB links 46, 48, 50 and 52 may communicate via a hub 44 and USB 40 with the transceiver 10 for such purposes as communicating with a residential computer regarding power usage of various appliances, communicating with these appliances to determine their power usages, communicating with the appliances to regulate their power usages, etc.

Figure 2:
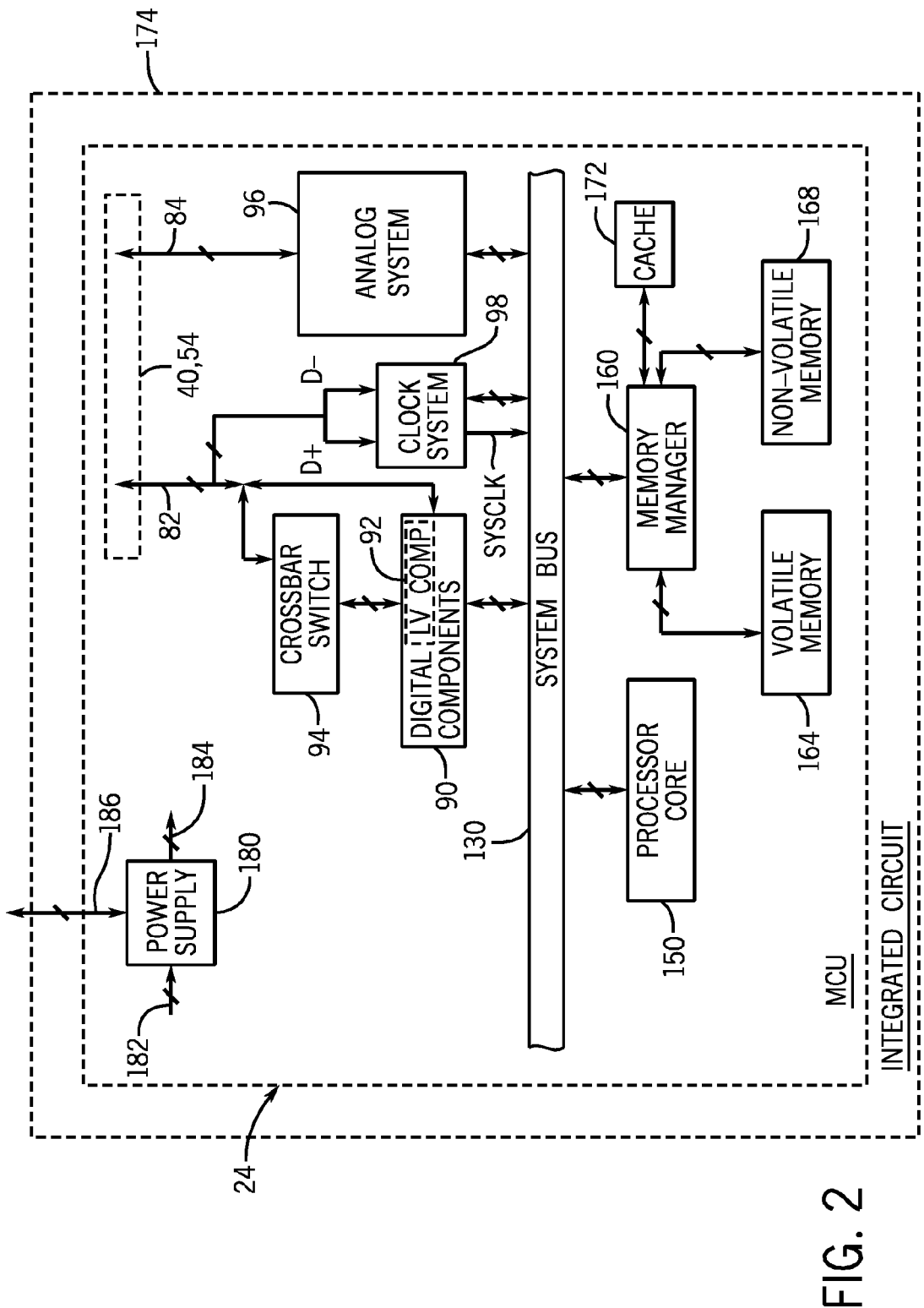
FIG. 2 is a schematic diagram of a microcontroller unit of the system of FIG. 1 according to an exemplary embodiment.

Referring to FIG. 2, in accordance with embodiments, the MCU 24 may be part of an integrated circuit 174. In some embodiments, the components of the MCU 24 may be fabricated on a single die of the integrated circuit 174. In other embodiments, the components of the MCU 24 may be fabricated on more than one die of the integrated circuit 174. Thus, many variations are contemplated, which are within the scope of the appended claims.

Among its components, the MCU 24 includes a processor core 150. As a non-limiting example, the processor core 150 may be a 32-bit core, such as the Advanced RISC Machine (ARM) processor core, which executes a Reduced Instruction Set Computer (RISC) instruction set. In general, the processor core 150 communicates with various other system components of the MCU 24, such as a memory controller, or manager 160, over a system bus 130. In general, the memory manager 160 controls access to various memory components of the MCU 24, such as a cache 172, a non-volatile memory 168 (a Flash memory, for example) and a volatile memory 164 (a static random access memory (SRAM), for example).

For purposes of producing clock signals for use by the components of the MCU 24, such as the processor core 150, the MCU 24 may include a clock system 98. As depicted in FIG. 2, for purposes of an example, the clock system 98 is depicted as providing a system clock signal called "SYS-CLK" in FIG. 2 to the system bus 130. In general, the clock system 98 recovers a clock signal used in the communication of bursty data on data lines (labeled as the "D+" and "D−" in FIG. 2) over the USB 40 and may use this recovered clock signal as the system clock signal.

The MCU 24 includes various digital peripheral components 90, which may include components (called "low voltage components 92" herein) that use a relatively small supply voltage, such as (as non-limiting examples) a programmable counter/timer array (PCA), a universal asynchronous receiver/transmitter (UART), a system management bus (SMB) interface, a serial peripheral interface (SPI), and so forth. In general, the collective power that is dissipated by the low voltage components 92 increases with the supply voltage that is provided to these components 92; and in general, the maximum operating frequency of the components 92 also varies with the supply voltage. To trim the supply voltage to a magnitude that minimizes power dissipation, allows the low voltage digital components 92 to operate at desired frequencies and takes into account process variation, the MCU 24 may include a monitoring circuit (not shown) that is used during product testing for purposes of monitoring the performance of the low voltage digital components while the supply voltage to these components is varied. In accordance with some embodiments, the MCU 24 may include a crossbar switch 94, which permits the programmable assignment of the digital peripheral components 90 to digital input/output terminals 82 of the MCU 24. In this regard, the MCU 24 may be selectively configured to selectively assign certain input/output terminals 82 to the digital peripheral components 90.

In accordance with embodiments, the MCU 24 includes an analog system 96, which communicates analog signals on external analog terminals 84 of the MCU 24 and generally forms the MCU's analog interface. As an example, the analog system 96 may include various components that receive analog signals, such as analog-to-digital converters (ADCs), comparators, and so forth.

As depicted in FIG. 2, the MCU 24 includes a power supply 180, which generates and regulates various supply voltages, which are communicated via corresponding supply voltage rails 184 to various power consuming components and subsystems of the MCU 24. As described below, in accordance with at least some embodiments disclosed herein, the MCU 24 configures, or programs, the power supply 180 with a particular configuration (out of multiple possible configurations) to minimize a collective power dissipation that is incurred by the voltage regulating components of the power supply 180.

In general, the power consuming components and subsystems of the MCU 24 present a wide range of loads that consume varying amounts of power and use different supply voltages. For example, some of the components of the MCU 24, such as the non-volatile memory 168, may use a relatively high supply voltage (1.8 volts (V), as a non-limiting example); and other components, such as, the processor core 150, a direct memory access (DMA) controller (not shown) and, in general, the low voltage digital components 92, may use a relatively low supply voltage (0.8 V, as a non-limiting example).

As depicted in FIG. 2, the power supply 180 includes input terminals 182, which receive input DC voltages that the power supply 180 converts into the supply voltages that appear on the supply voltage rails 184. As a non-limiting example, one or more of the input terminals 182 may be coupled to a battery (not shown). As another non-limiting example, one or more of the input terminals 182 may be coupled to the output terminals of an AC-to-DC converter, which generates the input voltage for the power supply 180 from an AC voltage (a 120 V wall voltage, as a non-limiting example). The power supply 180 may be coupled via terminals 186 to one or more external filtering or storage components, which are external to the MCU 24 and are used by the power supply 180. As non-limiting examples, these external components may be inductors (for a switching regulator, as a non-limiting example); one or more capacitors (used by the switching regulator, used for filtering); and so forth.

Figure 3:
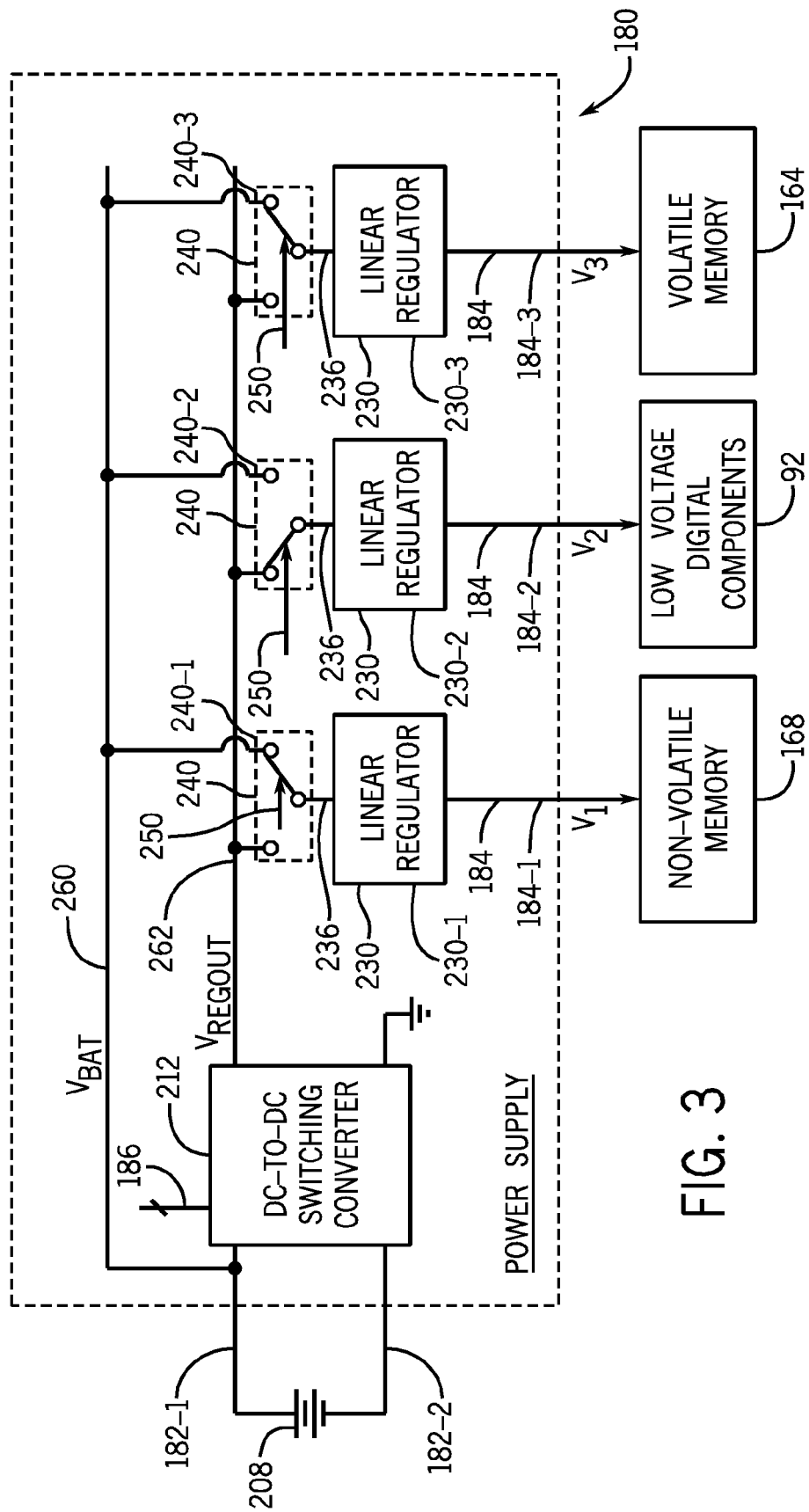
FIG. 3 illustrates a power supply subsystem of the microcontroller unit of FIG. 2 according to an exemplary embodiment.

Referring to FIG. 3, in accordance with an exemplary embodiment, the power supply 180 may include a DC-to-DC switching converter 212, such as a Buck switching converter (as a non-limiting example), to, in general, step down and regulate the voltage that is received at one or more of the power supply's input terminals 182. In other embodiments, the switching converter 212 may be a step up converter, such as a Boost converter (as a non-limiting example).

For the example that is depicted in FIG. 3, the switching converter 212 regulates an input voltage that is received at input terminals 182-1 and 182-2 to produce a regulated output voltage (called "$V_{REGOUT}$" in FIG. 3) on a supply voltage line 262. As a non-limiting example, the input voltage to the terminals 182-1 and 182-2 is supplied by a battery 208 (or by a bank of batteries), although the switching converter 212 may receive its input voltage from other sources, in accordance with other embodiments. As depicted in FIG. 3, the battery 208 provides a voltage (called "$V_{BAT}$" in FIG. 3), which appears on a supply voltage line 260.

For purposes of further regulating the $V_{REGOUT}$ and $V_{BAT}$ voltages to generate supply voltages for the various components of the MCU 24, the power supply 180 includes linear regulators 230 (linear regulators 230-1, 230-2 and 230-3, being depicted in FIG. 3, as non-limiting examples). As a non-limiting example, a given linear regulator may, in general, include a differential amplifier and a pass element (a transistor, for example). The differential amplifier controls the pass element to regulate a voltage difference between the regulator's input and output voltages for purposes of regulating the regulator's output voltage. Although FIG. 3 depicts three linear regulators 230, the power supply 180 may include fewer or more than three linear regulators 230, in accordance with other embodiments.

Each linear regulator 230 provides a regulated supply voltage to a particular supply voltage rail 184, which, in turn, is coupled to an associated load (one or more components of the MCU 24, for example). For the example that is depicted in FIG. 3, the linear regulator 230-1 provides a supply voltage (called "$V_1$" in FIG. 3) on a supply voltage rail 184-1 to relatively high voltage digital components, such as (as a non-limiting example) the non-volatile memory 168. The linear regulator 230-2 provides a supply voltage (called "$V_2$" in FIG. 3) on a supply voltage rail 184-2 to relatively low supply voltage components, such as the low voltage digital components 92 (as a non-limiting example). The linear regulator 230-3 provides a supply voltage (called "$V_3$" in FIG. 3) to a supply voltage rail 184-3 to other relatively high voltage components, such as the volatile memory 164.

Various components and subsystems of the MCU 24 may therefore be associated with different supply voltages that span from a relatively low supply voltage, such as 0.8 V (as a non-limiting example), to a relatively high supply voltage, such as 1.8 V (as another non-limiting example). Moreover, the various components and subsystems of the MCU 24 may consume varying amounts of power, as the current supplied by a given linear regulator 230 may vary, depending on the load that draws power from the regulator 230.

The linear regulator 230 has an input terminal 236 that receives the regulator's input voltage. In general, due to the linear regulator 230 regulating its output voltage by regulating a voltage drop across its pass element (a voltage drop across a drain-to-source path of a metal oxide semiconductor field-effect-transistor (MOSFET), for example, the regulator 230 imposes a constraint for the regulator's input voltage to be higher than the regulator's output voltage, even if the regulator 230 is a low dropout regulator (LDO) that incurs relatively little voltage drop. Therefore, to the extent that multiple linear regulators 230 are coupled to the same input voltage (such as the $V_{REGOUT}$ voltage, for example), the commonly shared input voltage is constrained to remain at or above the minimum input voltage for the group.

The power supply 180 conserves power that may otherwise be dissipated by the linear regulators 230 by selectively coupling the input terminals 236 of the linear regulators 230 to power sources in a process that considers the power consumption ramifications of coupling multiple linear regulators 230 to the same power source and selectively coupling the linear regulators 230 to more than one power source. As a non-limiting example, if the linear regulator 230-1 supplies a 1.8 V supply rail voltage, then the input voltage source for the linear regulator 230-1 is constrained to provide a minimum of 1.8 V. This means that if other linear regulators 230 that may supply relatively lower supply rail voltages share the same input voltage source, then these regulators, in general, are subject to relatively larger voltage drops (and therefore relatively larger power losses), than would occur if these other linear regulators 230 were coupled to voltage sources that supply voltages closer to the minimum input voltages for these regulators 230. For example, if the linear regulator 230-2 provides a supply voltage of 0.8 V and is coupled to a 1.8 V input voltage, the pass transistor of the linear regulator 230-2 is subject to a voltage drop of at least one volt, which results in a greater power loss for the linear regulator 230-2 than if the regulator 230-2 were coupled to a voltage source that supplies a voltage less than 1.8 V.

The number of power sources (for this example, voltage sources) for the linear regulators 230, however, is finite; and more specifically is less than the number of linear regulators 230, in accordance with some embodiments. Therefore, some of the linear regulators 230 share power sources. As described herein, the MCU 24 programs, or configures, the power supply 180 to select power sources for the linear regulators 230 in a manner to control (minimize, for example) the overall, or collective, power dissipation by the linear regulators 230.

For purposes of regulating the collective power dissipation of the linear regulators 230, the power supply 180, in accordance with exemplary embodiments, includes switches 240 (switches 240-1, 240-2 and 240-3, being depicted as examples in FIG. 3), which in general, may be operated or controlled (by the processor core 150, for example) for purposes of selectively coupling power sources to the linear regulators 230 in one of multiple permutations, or switch coupling configurations. For example, the switches 240 may selectively couple the linear regulators 230 to either the voltage supply line 262 (communicating the $V_{REGOUT}$ voltage), the voltage supply line 260 (communicating the $V_{BAT}$ voltage) or another voltage that is supplied by a power source other than the DC-to-DC switching converter 212 or battery 208.

For the non-limiting example that is depicted in FIG. 3, each switch 240 is associated with one of the linear regulators 230 and couples the input terminal 236 of its associated linear regulator 230 to either the supply voltage line 260 or the supply voltage line 262. Therefore, depending on the position of a given switch 240 (as set by a signal received by an associated control terminal 250 of the switch 240), the input voltage for a given linear regulator 230, for this example, may be the $V_{BAT}$ voltage or the $V_{REGOUT}$ voltage. It is noted that the switches 240 may be switchable to more than two positions (and thus, switchable to select a source from a group of more than two sources), in accordance with other embodiments. Thus, many variations are contemplated, which are within the scope of the appended claims.

Depending on the positions for the switches 240, a number of different switch coupling configurations are possible, where each switch coupling configuration refers to the set of couplings among the input terminals 236 of the linear regulators 230 and the power sources. The switch coupling configurations, in turn, are associated with collective power dissipations that vary with respect to each other. Therefore, in accordance with some embodiments, the MCU 24 selects a particular switch coupling configuration to control (minimize, for example) the collective power dissipation by the linear regulators 230.

Figure 4:
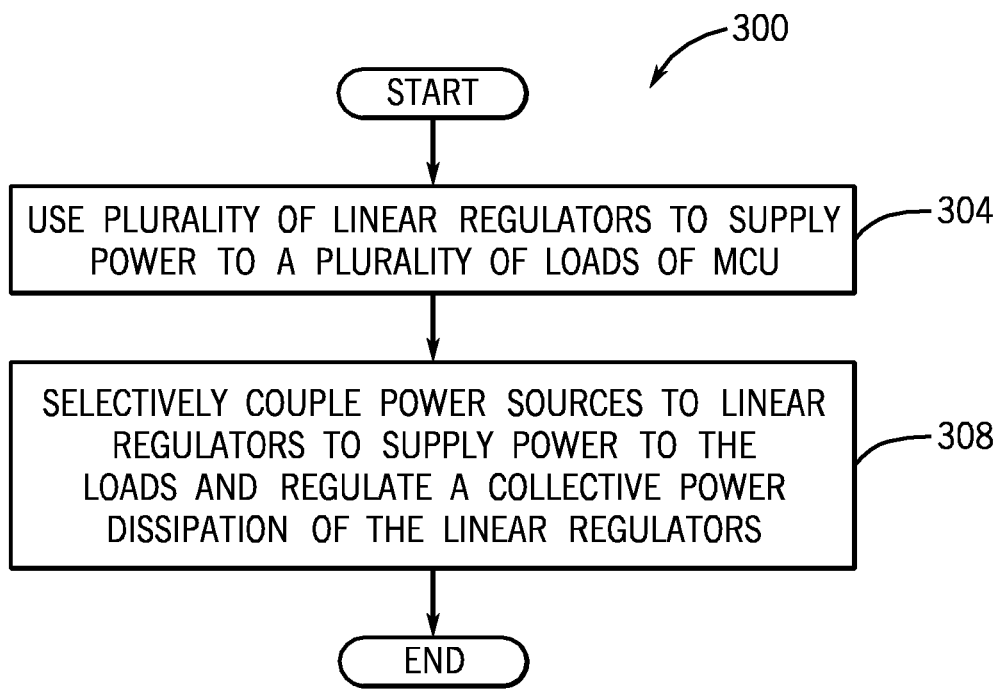
FIGS. 4 and 5 are flow diagrams depicting techniques to regulate a collective dissipation of linear regulators of the power supply of FIG. 3 according to exemplary embodiments.

Thus, referring to FIG. 4 in conjunction with FIG. 3, in accordance with an exemplary embodiment, a technique 300 includes using (block 304) a plurality of linear regulators to supply power to a plurality of loads of an MCU. The technique 300 includes selectively coupling (block 308) power sources to the linear regulators to supply power to the loads and regulate a collective power dissipation of the linear regulators.

Referring to FIG. 3, as a more specific non-limiting example, the $V_{BAT}$ supply voltage is greater than the $V_{REGOUT}$ supply voltage; and the linear regulator 230-1 may supply a relatively high supply voltage $V_1$ to the components of the non-volatile memory 168 and may be configured as shown through its associated switch 240-1 to receive its input voltage from the $V_{BAT}$ supply voltage line 260. Although by coupling the linear regulator 230-1 to the $V_{BAT}$ supply voltage line 260 (as compared to coupling the regulator 230-1 to the $V_{REGOUT}$ supply voltage line 262) the power loss for the linear regulator 230-1 is greater, the switching converter 212 may reduce the magnitude of the $V_{REGOUT}$ supply voltage, because the $V_{REGOUT}$ supply voltage level is not constrained by the input voltage minimum that is imposed by the linear regulator 230-1. In this manner, for this example, if it is assumed that the other linear regulators 230-2 and 230-3 supply relatively lower supply voltages $V_2$ and $V_3$, respectively, then the $V_{REGOUT}$ supply voltage may be reduced, a reduction that lowers the power dissipation levels of the linear regulators 230-2 and 230-3. Under certain conditions, the savings in the power losses gained by lowering the input voltages of the linear regulators 230-2 and 230-3 may more than offset a relative increase in power loss of the regulator 230-1 due to the regulator 230-1 being coupled to a relatively higher input voltage.

In accordance with exemplary embodiments, the MCU 24 may include a controller for purposes of selecting the appropriate switch coupling configuration for the linear regulators 230, i.e., selecting the appropriate switch coupling configuration for coupling a plurality of power sources to the linear regulators 230 for purposes of minimizing the collective power dissipation of the linear regulators 230. Depending on the particular embodiment, the controller may be (as non-limiting examples) the processor core 150 (see FIG. 2), field programmable logic, hardwired circuitry, or other circuitry.

The particular switch coupling configuration that is used may be identified by input data to the MCU 24; or alternatively, the MCU 24 may determine, or select, the switch coupling configuration. As a non-limiting example, the MCU 24 may, using the execution of machine executable instructions or through the use of hardwired circuitry, may apply an algorithm or formula for purposes of selecting the particular switch coupling configuration, which considers the input voltages of the linear regulators, the power demands (sensed or predicted) of the loads to the linear regulators, and so forth. In other embodiments, the MCU 24 may determine the switch coupling configuration, through an iterative process, which considers the collective power dissipation for each possible switch coupling configuration.

Figure 5:
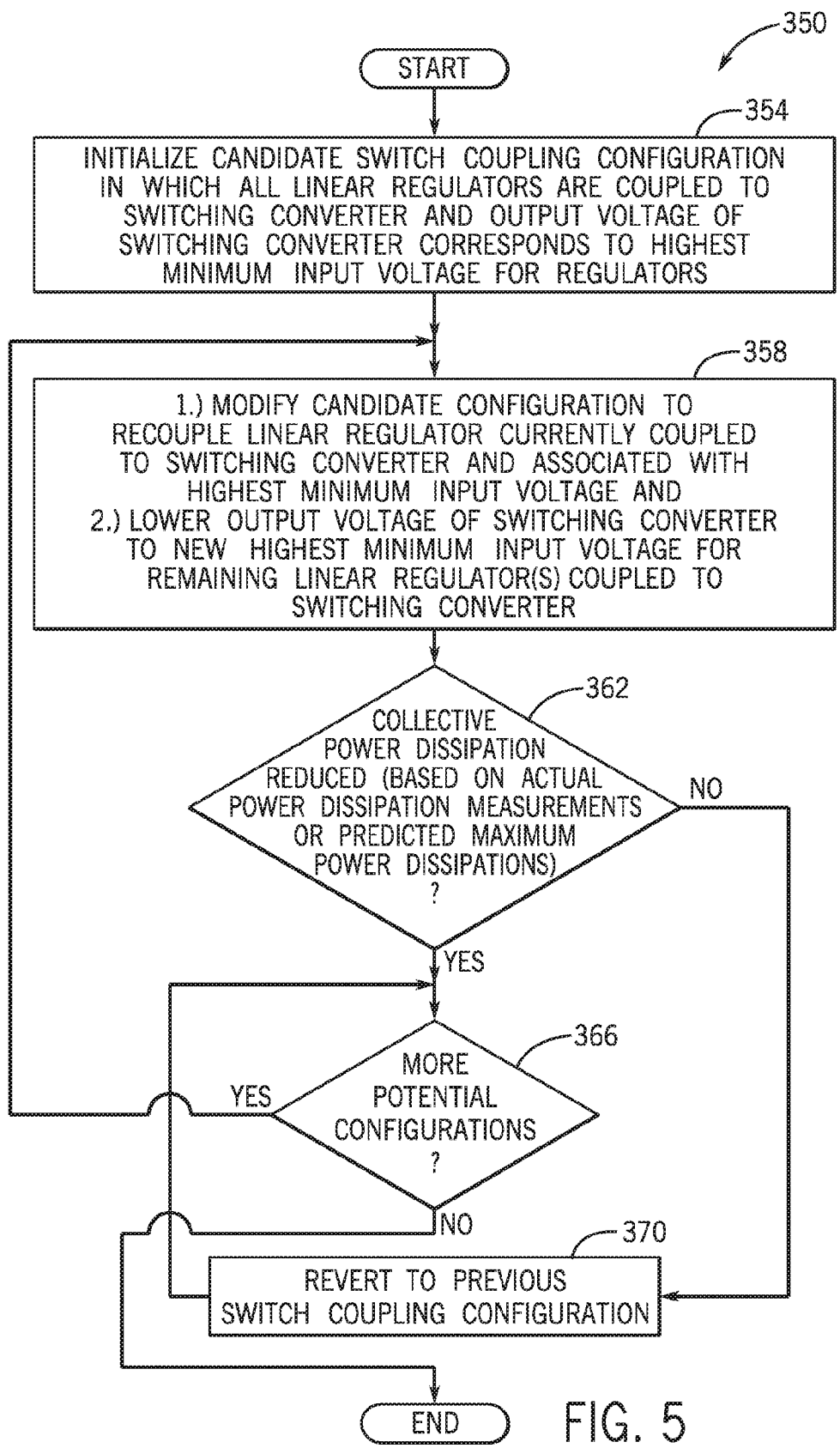

FIG. 5 depicts an example technique 350 of such an iterative process, which may be used by a controller (the processor core 150, for example) of the MCU 24, in accordance with some embodiments. Pursuant to the technique 350, the controller first initializes (block 354) a candidate switch configuration for which 1. all of the linear regulators 230 are coupled to a switching converter output voltage (such as the $V_{REGOUT}$ voltage, for example); and 2. the output voltage of the switching converter corresponds to the highest minimum input voltage for the linear regulators.

Next, according to the technique 350, the controller changes the candidate switch coupling configuration in an iterative process that evaluates a change in the candidate switch coupling configuration by changing the input coupling for one linear regulator at a time. More specifically, pursuant to block 358, the controller: 1. modifies the candidate switch coupling configuration to recouple a linear regulator that is currently coupled to the switching converter and associated with the highest minimum input voltage; and 2. lowers the output voltage of the switching converter to the new highest minimum input voltage for the remaining linear regulator(s) that are coupled to the switching converter.

Using the now modified candidate switch coupling configuration, the controller determines (decision block 362) whether the collective power dissipation has been reduced. Depending on the particular embodiment, this determination may be made by the controller considering actual power dissipation measurements, or may be made by the controller predicting maximum power dissipations. If the controller determines (decision block 362) that the collective power dissipation has been reduced and determines (decision block 366) that more switch coupling configurations are possible, then the controller proceeds with another iteration in an attempt to further lower the power dissipation by returning to block 358. If the controller determines (decision block 362) that collective power dissipation was not reduced by the latest candidate switching coupling configuration, then the controller reverts (block 370) to the previous switch coupling configuration and returns to block 358 if more switching coupling configurations are available.

While a limited number of embodiments have been disclosed herein, those skilled in the art, having the benefit of this disclosure, will appreciate numerous modifications and variations therefrom. It is intended that the appended claims cover all such modifications and variations.

What is claimed is:

1. An apparatus comprising:
   a system comprising a plurality of loads, a plurality of linear regulators, a controller, an adjustable DC power source and a plurality of switches, wherein:
      the adjustable DC power source is one of a plurality of DC power sources;
      the linear regulators receive a plurality of DC voltages, each DC voltage being provided by one of the DC power sources and the number of the DC power sources being less than the number of linear regulators;
      the linear regulators are adapted to supply power to the plurality of loads;
      the switches couple the DC voltages to the linear regulators according to one of a plurality of switch configurations; and
      the controller is adapted to control both the DC output voltage provided by the adjustable DC power source and select the switch coupling configuration from the plurality of switch coupling configurations to regulate a collective power dissipation of the linear regulators.

2. The method of claim 1, wherein the controller comprises a processor core.

3. The method of claim 1, wherein the controller is adapted to select the DC output voltage provided by the adjustable DC power source and select the switch coupling configuration that minimizes the collective power dissipation of the linear regulators.

4. The method of claim 1, wherein at least one of the switch coupling configurations is associated with coupling a battery to at least one of the linear regulators.

5. The method of claim 4, wherein at least one of the switch coupling configurations is further associated with coupling a DC-to-DC switching converter to at least one other linear regulator of the linear regulators.

6. A method comprising:
   using a plurality of linear regulators to supply power to a plurality of loads;
   providing DC voltages for the plurality of linear regulators, wherein the number of DC voltages is less than the number of linear regulators;
   regulating a collective power dissipation of the linear regulators, wherein the regulation of the collective power dissipation comprises selectively coupling the DC voltages to the linear regulators and controlling a DC power source providing one of the DC voltages to adjust the DC voltage provided by the DC power source.

7. The method of claim 6, wherein the regulating comprises using a controller to operate the switches to regulate the collective power dissipation.

8. The method of claim 7, wherein the using the controller comprises selecting a switch coupling configuration to couple the DC voltages and the linear regulators together from a plurality of configurations to regulate the collective power dissipation.

9. The method of claim 6, wherein the selectively coupling comprises coupling the linear regulators to a battery voltage and to another voltage provided by a converter in response to the battery voltage.

10. The method of claim 6, wherein the selectively coupling comprises selectively coupling the linear regulators to a DC-to-DC switching converter.

11. An apparatus comprising:
an integrated circuit comprising a plurality of loads, a plurality of linear regulators, a controller an adjustable DC power source and a plurality of switches, wherein:
the adjustable DC power source is one of a plurality of DC power sources;
the linear regulators receive a plurality of DC voltages, each DC voltage being provided by one of the DC power sources and the number of the DC power sources being less than the number of linear regulators;
the linear regulators supply power to the plurality of loads;
the switches couple the DC voltages to the linear regulators according to one of a plurality of switch coupling configurations; and
the controller is adapted to control both the DC output voltage provided by the adjustable DC power source and select the switch coupling configuration from the plurality of switch coupling configurations to regulate a collective power dissipation of the linear regulators.

12. The apparatus of claim 11, wherein the controller comprises a processor.

13. The apparatus of claim 11, wherein the controller selects the switch coupling configuration and controls the DC output voltage provided by the adjustable DC power source to minimize the collective power dissipation.

14. The apparatus of claim 11, wherein at least one of the switch coupling configurations comprises a configuration in which multiple linear regulators of the plurality of linear regulators are coupled to the same power source.

15. The apparatus of claim 11, wherein at least one of the switch coupling configurations comprises a configuration in which a battery voltage is coupled to at least one of the linear regulators.

16. The apparatus of claim 11, wherein at least one of the switch coupling configurations comprises a configuration in which a DC-to-DC switching converter is coupled to at least one of the linear regulators.

17. The apparatus of claim 11, wherein one of the loads comprises one or more memory components associated with a first supply voltage and another one of the loads comprises one or more digital components associated with a second supply voltage having a magnitude less than a magnitude of the first supply voltage.

18. The method of claim 6, wherein the regulating comprises regulating the collective power dissipation based at least in part on actual power dissipation measurements or predicted maximum power dissipations.

* * * * *